Nov. 25, 1930.  W. G. PRICE  1,782,663
HYDRAULIC BRAKING APPARATUS
Original Filed Feb. 26, 1927
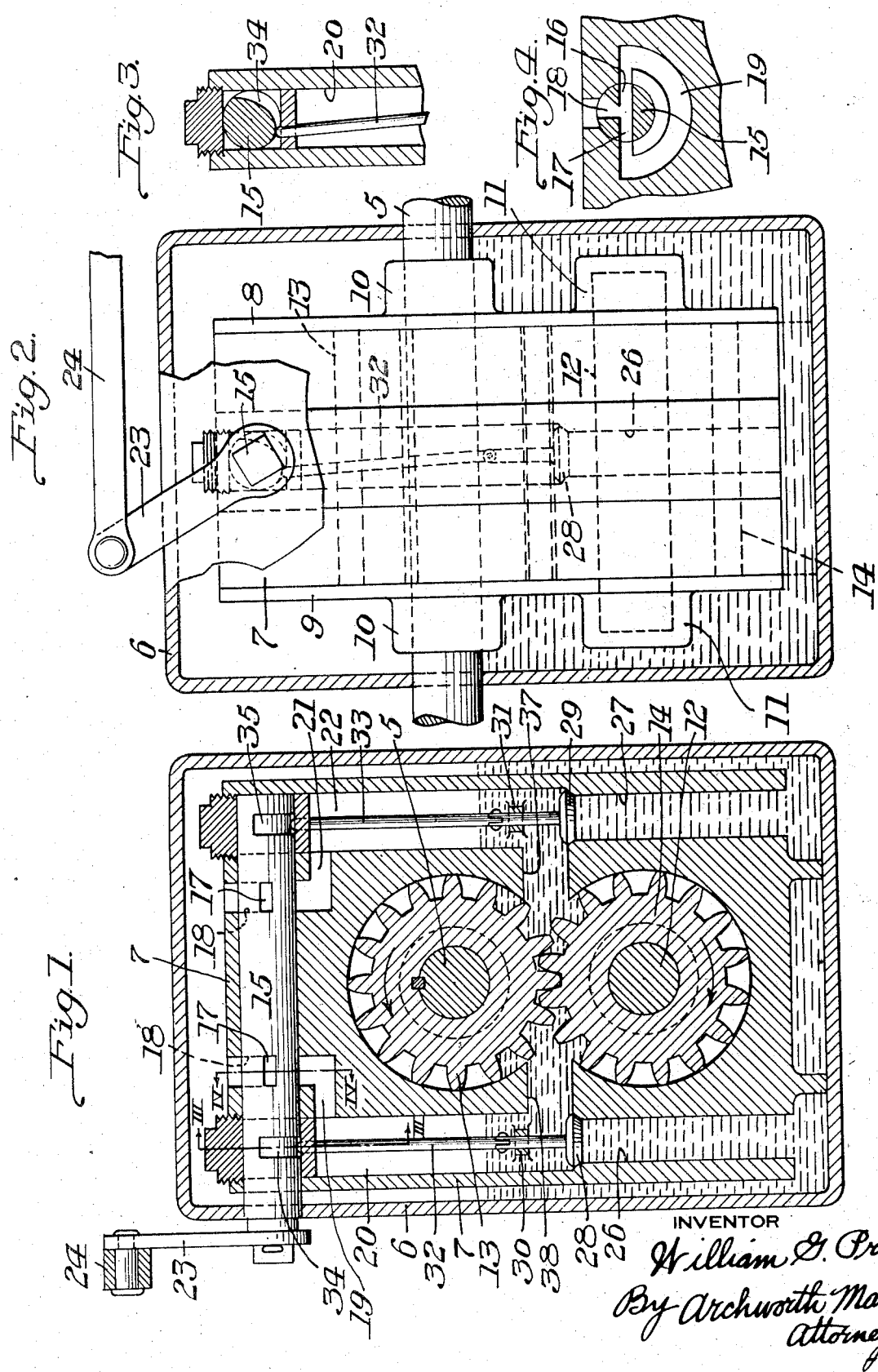

Patented Nov. 25, 1930

1,782,663

UNITED STATES PATENT OFFICE

WILLIAM G. PRICE, OF YAKIMA, WASHINGTON; MARY KELLEY PRICE EXECUTRIX OF SAID WILLIAM G. PRICE, DECEASED

HYDRAULIC BRAKING APPARATUS

Original application filed February 26, 1927, Serial No. 171,187. Divided and this application filed October 7, 1927. Serial No. 224,601.

My invention relates to hydraulic brakes of that type wherein liquid is placed under compression to retard the movement of the transmission mechanism of motor vehicles or other machinery.

For convenience of description, the invention is hereinafter described as employing oil as the liquid medium and as applied to automobiles, but it will be understood that liquids other than oil may be employed and that the invention is applicable to various other types of machinery as above indicated.

This invention constitutes a division of my application Serial No. 171,187, filed February 26, 1927 (Patent No. 1,766,540). In the embodiment of my invention herein described, I disclose a gear pump arrangement for actuating or operating upon the oil, to produce the desired braking forces, and secure the hereinafter enumerated advantages by the use of but a single valve-control lever and only two check valves, in combination with the necessary ports and passages for the movement of air and oil within the system, and means for positively controlling the check valves.

One object of my invention is to provide a simplified form of control mechanism which permits the pump to operate only upon either the air in the system or the oil contained therein, and which can be adjusted to cause the pump to operate upon the oil and air simultaneously, in any desired relative degree.

A further object of my invention is to provide a braking system wherein, while the liquid medium may be caused to flow by gravity to the compressing mechanism, such liquid will normally be held inert or out of operative relation to said mechanism when no braking operation is being performed.

Another object of my invention is to provide a control mechanism of simple form, whereby the braking forces which can be created when a vehicle is moving in one direction, may be duplicated to retard movement of the vehicle in the opposite direction.

Still another object of my invention is to simplify and improve generally the operation and efficiency of fluid pressure brakes.

In the accompanying drawings, Figure 1 is a cross sectional view, in elevation, of one form of apparatus embodying my invention; Fig. 2 is a view, taken at right angles to Fig. 1, but showing the oil reservoir in section and the pump casing in elevation; Fig. 3 is a view taken on the line III—III of Fig. 1, and Fig. 4 is a view taken on the line IV—IV of Fig. 1.

The apparatus is shown as employed for braking or retarding the movement of a shaft 5 that may be the transmission shaft of an automobile or another shaft connected, in any suitable manner, to the differential gearing (not shown) and axles of the automobile. The reservoir or main casing 6 for containing a pool of oil or other liquid in its lower portion and a body of air in its upper portion is rigidly supported in any suitable manner, the shaft 5 extending through the end walls thereof as shown in Fig. 2. A gear or pump casing 7 is supported within the reservoir 6 and has end plates 8 and 9 through which the shaft 5 extends and which are provided with extensions 10 that serve as bearings. The end plates 8 and 9 are also provided with recessed bosses 11 that serve as bearings for a shaft 12.

A gear wheel 13 is rigidly secured to the shaft 5 and a gear wheel 14 is mounted upon the shaft 12, so that as the shaft 5 rotates, the gear wheels 13 and 14 will also be rotated.

The upper end of the casing has a bore within which a rotary valve 15 is supported, such valve being provided with pairs of ports 16, 17 and 18 and controlling flow through conduits 19—20 and 21—22.

The valve 15 has a stem portion that extends to the side of the reservoir 6 and is connected through a crank 23 to one end of an operating lever or pull rod 24. The opposite end of the rod 24 will have connection with a brake pedal (not shown) of an automobile, or to any other suitable operating means.

Near the lower end of the pump casing 7, I provide ducts 26 and 27 through which oil or other liquid may flow upwardly under conditions to be hereinafter described, but wherein downward or backflow of the oil is prevented by check valves 28 and 29 respectively. The valves 28 and 29 are provided with guide stems that are slidably supported in webs or ribs 30 and 31. Thrust rods 32 and 33 have jointed connections with the upper ends of the valve stems, and the upper ends of these rods extend into slots 34 and 35, respectively, in the valve member 15 and whose inner walls are formed to serve as cam surfaces for holding the thrust rods 32 and 33 and the valves 28 and 29 against upward movement when the valve is turned to non-braking position with the ports open, as shown more clearly in Figs. 3 and 4.

When the parts are in non-braking position as shown in the drawing, movement of the gear wheels 13 and 14 in the direction indicated by the arrows will cause that portion of the oil which is above the valve 29 to be drawn through the port 37 into the pump chamber and discharged from the pump chamber through the port 38. In this position of the parts, air will then be drawn from the upper part of the casing in past the valve 15, through the conduits 21 and 22 and discharged with the small amount of oil located above the valves 28 and 29 through conduits 20 and 19, and valve port 18. The valves 28 and 29 being held firmly to their seats will prevent flow of oil from the ducts 26 and 27, and the pump gears will therefore operate only upon air, thus avoiding drag on the mechanism and heating of the oil such as would occur if oil were permitted to pass into the pump chamber.

When it is desired to utilize the fluid as a braking element, the valve 15 is rotated to partially close the ports 18, and to release the upper ends of the rods 32 and 33. If at this time the gear wheels are moving in the direction indicated by the arrows in Fig. 1, oil will be drawn from the duct 27, past the valve 29 into the pump chamber. Discharge of such oil will take place through the conduits 20 and 19, past the valve 15 to the main body of oil in the reservoir. The amount of braking force exerted will be determined by the position of the valve 15, since if it is turned only slightly from the position shown in Figs. 1 and 4, the amount of air admitted through the conduits 21 and 22 will be greater than the amount of oil drawn through the port 37, and the restriction to flow through the conduits 20 and 19 and past the valve 15 will not be very great, hence no great braking force will be applied. Continued movement of the valve 15 to further close the ports 18 will result both in restriction to downflow of air through the conduits 21 and 22 and consequent increase in the amount of oil drawn into the pump chamber and also cause a further restriction to discharge of oil and air through the conduits 20 and 19.

While during the operation just described the valve stem 32 is not held down by the cam, the pressure of the oil and air discharged through the port 38 will hold it to its seat and prevent downflow of oil to the duct 26.

If the shaft 5 is rotating in a direction the reverse of that indicated by the arrow on gear wheel 13, the oil and air will be drawn into the pump chamber through the port 38 and discharged through the port 37, the control of flow being effected by rotary movement of the valve 15, as above described. The quantity of oil in the reservoir is such that its level will preferably be as indicated in Fig. 1, when the pump gears are stationary, so that there will be a constant gravity flow of oil to the pump during braking operations. Notwithstanding the comparatively high level of oil, the gears will not pump oil when the control valve 15 is turned to inoperative position save for that small quantity which may be temporarily present above the valves 28 and 29, and such body of oil will be quickly discharged, so that the gear wheels will work only on air.

The ports 16 and 17 are at least partially closed when the valve 15 is turned to braking position, but the ports 18 are of such width that they are never completely closed, thus avoiding the building up of excessive pressures in the passageways 20—19 or 22—21, as the case may be; that is, depending upon in which direction the shaft 5 is turning.

I claim as my invention :—

1. Hydraulic braking apparatus, comprising a liquid reservoir, a pump casing having two oppositely disposed ports, a liquid duct adjacent to each port and extending to a point below the liquid level, a check valve for each duct, a conduit extending from the outer end of each of said ports, pumping mechanism within the casing for effecting a flow of liquid through said ports, means for controlling flow through said conduits, and means actuated by the last-named means for controlling movement of the check valves.

2. Hydraulic braking apparatus, comprising a liquid reservoir, a pump casing having two oppositely disposed ports, a liquid duct adjacent to each port and extending to a point below the liquid level, a check valve for each duct, a conduit extending from the outer end of each of said ports, pumping mechanism within the casing for effecting a flow of liquid through said ports, control valve mechanism for controlling flow through said conduits, and means controlled by said mechanism for holding the check valves closed when said control valve mechanism is in non-braking position.

3. Hydraulic braking apparatus, comprising a pump casing having two oppositely disposed ports, a liquid reservoir arranged to normally maintain a liquid level above said ports, a liquid duct adjacent to each port and extending to a point below the liquid level, a check valve for each duct, a conduit extending from the outer end of each of said ports, pumping mechanism within the casing for effecting a flow of liquid through said ports, means for controlling flow through said conduits, and means actuated by the last-named means for controlling movement of the check valves.

4. Hydraulic braking apparatus, comprising a movable member whose motion is to be retarded by braking forces, a liquid duct, a pump chamber having an inlet communicating with said duct and provided with a pair of ports, a pumping device in said chamber between said ports, having driving connection with said member, means for directing liquid from said inlet to one port when the pump is operated through movement of said member in one direction and for directing the incoming liquid to the other port when the said member is moved in the opposite direction, and means for varying the areas of said inlet and said ports in predetermined relation.

5. Hydraulic braking apparatus comprising a liquid duct, a pump casing having an inlet port communicating with said duct and with a source of air and having a discharge port, means for normally maintaining a liquid level above said ports, the said duct leading from a point below the liquid level to said inlet port, means for controlling flow of liquid and air through said ports, and means operating in predetermined relation to the first-named means for controlling flow of liquid from said duct.

Signed at Yakima, Wash., this 1st day of October, 1927.

WILLIAM G. PRICE.